(12) United States Patent
Kodama et al.

(10) Patent No.: US 8,978,720 B2
(45) Date of Patent: Mar. 17, 2015

(54) PNEUMATIC TIRE

(75) Inventors: Yuji Kodama, Owake (JP); Susumu Imamiya, Owake (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 13/635,379

(22) PCT Filed: Jun. 21, 2011

(86) PCT No.: PCT/JP2011/064182
§ 371 (c)(1),
(2), (4) Date: Sep. 14, 2012

(87) PCT Pub. No.: WO2011/162266
PCT Pub. Date: Dec. 29, 2011

(65) Prior Publication Data
US 2013/0008574 A1 Jan. 10, 2013

(30) Foreign Application Priority Data

Jun. 23, 2010 (JP) ................................ 2010-143066

(51) Int. Cl.
*B60C 9/18* (2006.01)
*B60C 5/01* (2006.01)
*B60C 9/04* (2006.01)
*B60C 9/02* (2006.01)

(52) U.S. Cl.
CPC ... *B60C 5/01* (2013.01); *B60C 9/04* (2013.01); *B60C 9/18* (2013.01); *B60C 9/0207* (2013.04)
USPC ............ 152/156; 152/157; 152/200; 152/516

(58) Field of Classification Search
USPC ......... 152/156, 157, 158, 198, 199, 200, 516, 152/526, 209.5
See application file for complete search history.

(56) References Cited

U.S. PATENT DOCUMENTS

| | | | | |
|---|---|---|---|---|
| 1,251,017 A | * | 12/1917 | Hann | 152/200 |
| 4,318,434 A | * | 3/1982 | Markow | 152/156 |
| 4,385,653 A | * | 5/1983 | Okazaki et al. | 152/209.5 |
| 4,428,411 A | * | 1/1984 | Markow et al. | 152/516 |
| 5,000,239 A | * | 3/1991 | Brayer et al. | 152/209.14 |
| 6,260,593 B1 | * | 7/2001 | Spragg et al. | 152/197 |

(Continued)

FOREIGN PATENT DOCUMENTS

| | | | |
|---|---|---|---|
| JP | 09-295360 | * | 11/1997 |
| JP | 2005/081873 | | 3/2005 |
| JP | 2010/018123 | | 1/2010 |

OTHER PUBLICATIONS

English machine translation of JP09-295360, dated Nov. 1997.*

(Continued)

*Primary Examiner* — Justin Fischer
*Assistant Examiner* — Robert Dye
(74) *Attorney, Agent, or Firm* — Thorpe North & Western (57) ABSTRACT

A pneumatic tire 1 including a cylindrical annular structure 10; a rubber layer 11 that will become a tread portion, provided along a circumferential direction of the annular structure 10, on an outer side 10so of the annular structure 10; and a carcass portion 12 including fibers covered with rubber, provided on both sides 2S in a direction parallel to a center axis (Y-axis) of a cylindrical structure 2 including the annular structure 10 and the rubber layer 11. In a meridian cross-sectional view of the structure 2, an outer side 11so of the rubber layer 11 and the outer side 10so of the annular structure 10 have the same form.

16 Claims, 9 Drawing Sheets

(56) References Cited

U.S. PATENT DOCUMENTS

| | | | |
|---|---|---|---|
| 2003/0062106 A1* | 4/2003 | Kanenari et al. | 152/517 |
| 2005/0145314 A1* | 7/2005 | Ikeda et al. | 152/458 |
| 2006/0094831 A1* | 5/2006 | Choi et al. | 525/331.9 |
| 2010/0051164 A1* | 3/2010 | Neubauer et al. | 152/564 |

OTHER PUBLICATIONS

Recent Technical Trends in Tires, Akimasa DOI, Journal of the Society of Rubber Industry, Japan, Sep. 1998, vol. 71, p. 588-594.
International Search Report dated Sep. 20, 2011.

* cited by examiner

PNEUMATIC TIRE

TECHNICAL FIELD

The present technology relates to a pneumatic tire.

BACKGROUND

Reducing the rolling resistance of a pneumatic tire is useful for improving the fuel consumption of a vehicle. Techniques exist for reducing the rolling resistance of a tire such as, for example, using a silica-compounded rubber for the tread.

SUMMARY OF THE TECHNOLOGY

While a technique for reducing the rolling resistance of pneumatic tires described in *Recent Technical Mends in Tires* (Akimasa D O I, Journal of the Society of Rubber Industry, Japan, Setember 1998, Vol. 71, p. 588-594) provides an improvement to the material, it is also possible to reduce the rolling resistance by modifying the structure of the pneumatic tire. In light of this, the present technology provides a structure whereby the rolling resistance of a pneumatic tire is reduced.

A pneumatic tire is provided, which includes a cylindrical annular structure; a rubber layer that will become a tread portion, provided along a circumferential direction of the annular structure on an outer side of the annular structure; and a carcass portion including fibers covered with rubber, provided on both sides in a direction parallel to a center axis of a cylindrical structure including the annular structure and the rubber layer. In a meridian cross-section of the structure, an outer side of the rubber layer and the outer side of the annular structure have the same form.

With the tire described above, the outer side of the rubber layer and the outer side of the annular structure are preferably parallel to the center axis.

With the tire described above, the annular structure is preferably disposed farther inward in a radial direction of the structure than the carcass portion.

With the tire described above, the annular structure is preferably a metal.

With the tire described above, a dimension in the direction parallel to the center axis of the annular structure is preferably not less than 50% and not more than 120% of a dimension in the direction parallel to the center axis of the rubber layer.

With the tire described above, a distance between the outer side of the annular structure and the outer side of the rubber layer is preferably not less than 3 min and not more than 20 mm.

EFFECT OF THE TECHNOLOGY

The present technology can provide a structure whereby the rolling resistance of a pneumatic tire is reduced.

BRIEF DESCRIPTION OF THE DRAWINGS

FIG. 2-1 is an exploded view of the tire according to the embodiment.

FIG. 2-2 is an exploded view of the tire according to the embodiment.

FIG. 2-3 is an exploded view of the tire according to the embodiment.

FIG. 7-1 is a meridian cross-sectional view illustrating a tire according to a modified example of the embodiment.

FIG. 7-2 is a meridian cross-sectional view illustrating a tire according to a modified example of the embodiment.

FIG. 7-3 is a meridian cross-sectional view illustrating a tire according to a modified example of the embodiment.

FIG. 9-1 is a plan view illustrating a ground contact patch form of an evaluation subject in the evaluations.

FIG. 9-2 is a plan view illustrating a ground contact patch form of an evaluation subject in the evaluations.

FIG. 9-3 is a plan view illustrating a ground contact patch form of an evaluation subject in the evaluations.

DETAILED DESCRIPTION

A form of the present technology (embodiment) is described below in detail while referring to the drawings. However, the present technology is not limited to the description given in the embodiment. Additionally, the constituents described below include those constituents that could be easily conceived by a person skilled in the art, and constituents that are essentially identical to those described herein. Furthermore, it is possible to combine the constituents described below as desired.

When eccentric deformation is increased to a limit thereof in order to reduce the rolling resistance of a pneumatic tire (hereinafter referred to as "tire" as necessary), ground contact area between the tire and a road surface decreases and ground contact pressure increases. As a result, viscoelastic energy loss, caused by deformations of a tread portion, increases, leading to an increase in rolling resistance. The present inventors focused on this point and attempted to reduce rolling resistance and enhance steering stability by ensuring the ground contact area between the tire and the road surface and maintaining eccentric deformation. Eccentric deformation is a single-dimensional mode of deformation in which a tread ring (crown region) of the tire shifts vertically while the round form of the tire is maintained. In order to ensure ground contact area between the tire and the road surface and maintain eccentric deformation, the tire according to this embodiment uses, for example, a structure including a cylindrical annular structure that is manufactured from a thin plate of a metal. A rubber layer is provided along a circumferential direction on an outer side of the annular structure. This rubber layer constitutes the tread portion of the tire.

Figure 1:
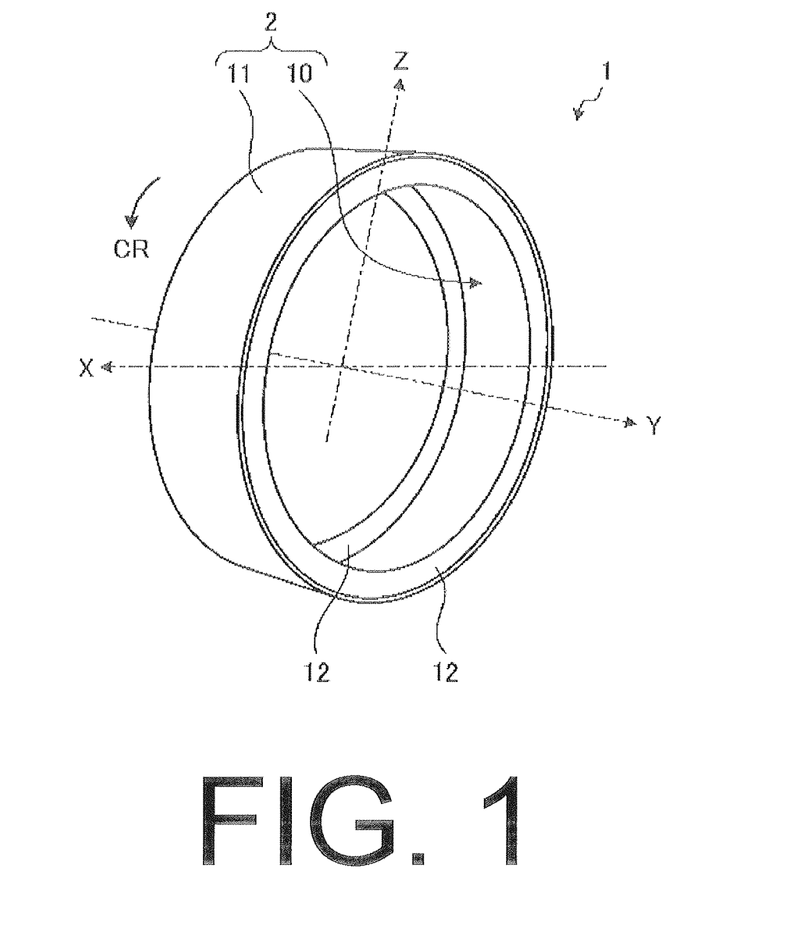
FIG. 1 is a perspective view of a tire according to the embodiment.
Figure 3:
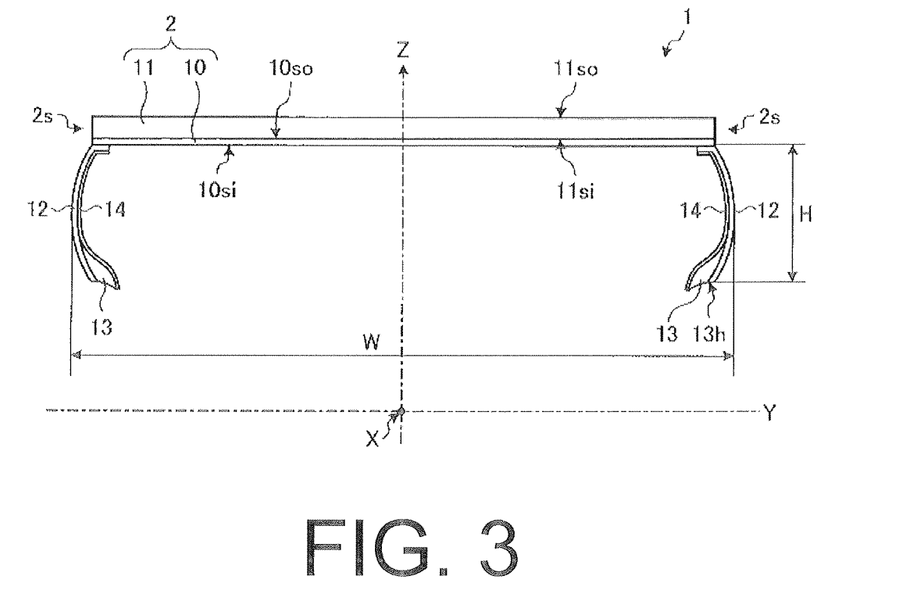
FIG. 3 is a meridian cross-sectional view of the tire according to the embodiment.
Figure 4:
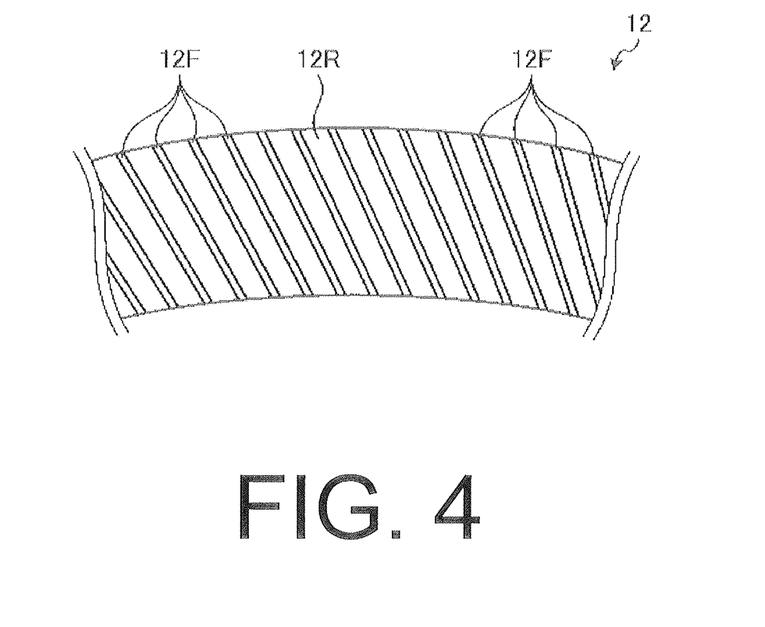
FIG. 4 is an enlarged view of a carcass portion included in the tire according to the embodiment.

FIG. 1 is a perspective view of a tire according to the embodiment. FIGS. 2-1 to 2-3 are exploded views of the tire according to the embodiment. FIG. 3 is a meridian cross-sectional view of the tire according to the embodiment. FIG. 4 is an enlarged view of a carcass portion included in the tire according to the embodiment. As illustrated in FIG. 1, a tire 1 is an annular structure. An axis that passes through a center of the annular structure is a center axis (Y-axis) of the tire 1. When in use, an interior of the tire 1 is filled with air.

The tire 1 rotates having the center axis (Y-axis) as a rotational axis. The Y-axis is the center axis and the rotational axis of the tire 1. An X-axis is an axis that is orthogonal to the Y-axis (the center axis (rotational axis) of the tire 1), and is parallel to a road surface that the tire 1 makes ground contact with. A Z-axis is an axis that is orthogonal to the Y-axis and the X-axis. A direction that is parallel to the Y-axis is a width direction of the tire 1. A direction that passes through the Y-axis and is orthogonal to the Y-axis is a radial direction of the tire 1. Additionally, a circumferential direction centered on the Y-axis is a circumferential direction of the pneumatic tire 1 (the direction indicated by the arrow "CR" in FIG. 1).

As illustrated in FIGS. 1, 2-1 to 2-3, and 3, the tire 1 includes a cylindrical annular structure 10, a rubber layer 11, and a carcass portion 12. The annular structure 10 is a cylindrical member. The rubber layer 11 is provided along the circumferential direction of the annular structure 10 on an outer side 10so of the annular structure 10, and constitutes a tread portion of the tire 1. As illustrated in FIG. 4, the carcass portion 12 includes fibers 12F covered with rubber 12R. Also, as illustrated in FIG. 3, the carcass portion 12 is provided on both sides 2S in the direction (i.e. the width direction) parallel to the center axis (Y-axis) of a cylindrical structure 2 that includes the annular structure 10 and the rubber layer 11. Moreover, with the tire 1, in a meridian cross-section of the structure 2, an outer side 11 so of the rubber layer 11 and the outer side 10so of the annular structure 10 have the same form.

In this embodiment, the annular structure 10 is fabricated from a metal material. Examples of the metal material that can be used for the annular structure 10 include carbon steel, stainless steel, aluminum alloy, and the like, but the metal material is not limited thereto. For example, fiber reinforced plastics such as CFRP (Carbon Fiber Reinforced Plastics), GFRP (Glass Fiber Reinforced Plastics), and the like can be used for the annular structure 10. The outer side 10so of the annular structure 10 and an inner side 11si of the rubber layer 11 are in contact with each other. In the embodiment, the annular structure 10 and the rubber layer 11 are fixed using, for example, an adhesive. As a result of such a structure, force can be transferred mutually between the annular structure 10 and the rubber layer 11. Methods of fixing the annular structure 10 to the rubber layer 11 are not limited to adhesives.

Figure 21:
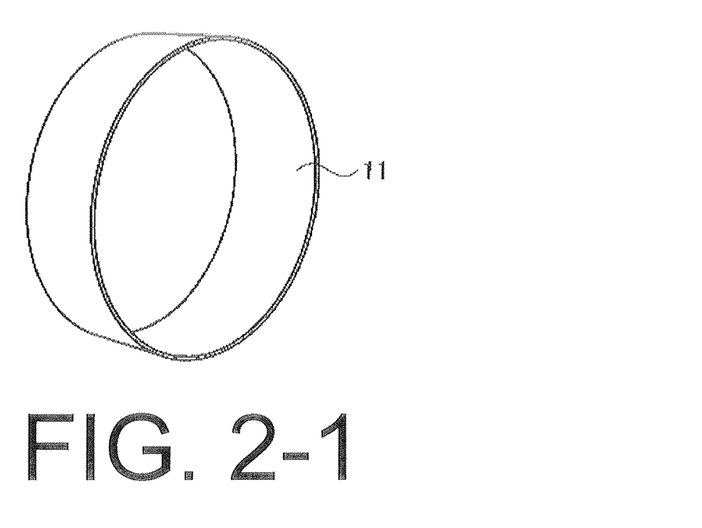
Figure 22:
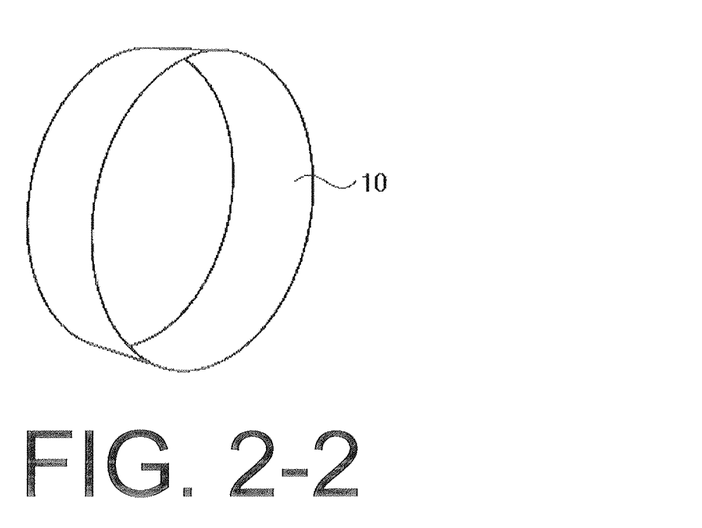
Figure 23:
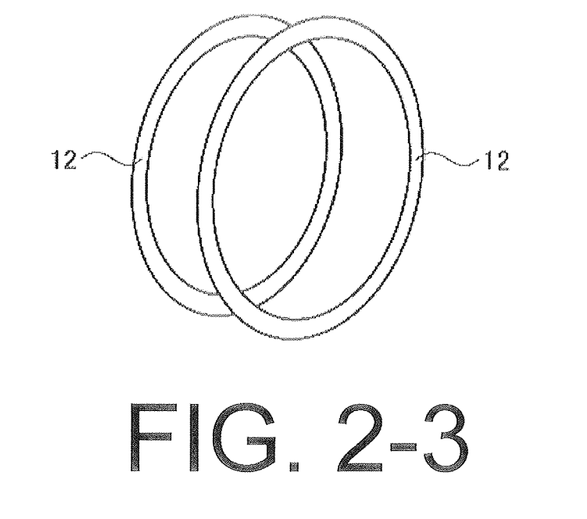

The rubber layer 11 includes a rubber material including a synthetic rubber, a natural rubber, or a mixture thereof; and carbon, $SiO_2$ or the like, which is added to the rubber material as a reinforcing material. As illustrated in FIG. 2-1, the rubber layer 11 is an endless belt-like structure. In the embodiment, as illustrated in FIG. 3, a meridian cross-section form of the rubber layer 11 is rectangular. The meridian cross-section form of the rubber layer 11 is not limited to a rectangular form, but preferably the outer side 11so and the inner side 11si (i.e. the outer side 10so of the annular structure 10) of the rubber layer 11 are parallel (including allowance and tolerance). This feature is described below. The rubber layer 11 may also have a tread pattern formed from a plurality of grooves in the outer side 11so.

The carcass portion 12 is a strengthening member that, together with the annular structure 10, fulfills a role as a pressure vessel when the tire 1 is filled with air. The carcass portion 12 and the annular structure 10 support the load that acts on the tire 1 due to the internal pressure of the air that fills the interior of the tire 1, and withstand dynamic loads received by the tire 1 during traveling. In this embodiment, an inner liner 14 is provided on an inner side of the carcass portion 12 of the tire 1. The inner liner 14 prevents the air filling the interior of the tire 1 from leaking. Each end of the carcass portion 12 has a bead portion 13 on the inner side thereof in the radial direction. The bead portions 13 mate with a rim of a wheel on which the tire 1 is attached. Note that the carcass portion 12 may mechanically bond with the rim of the wheel.

Figure 5:
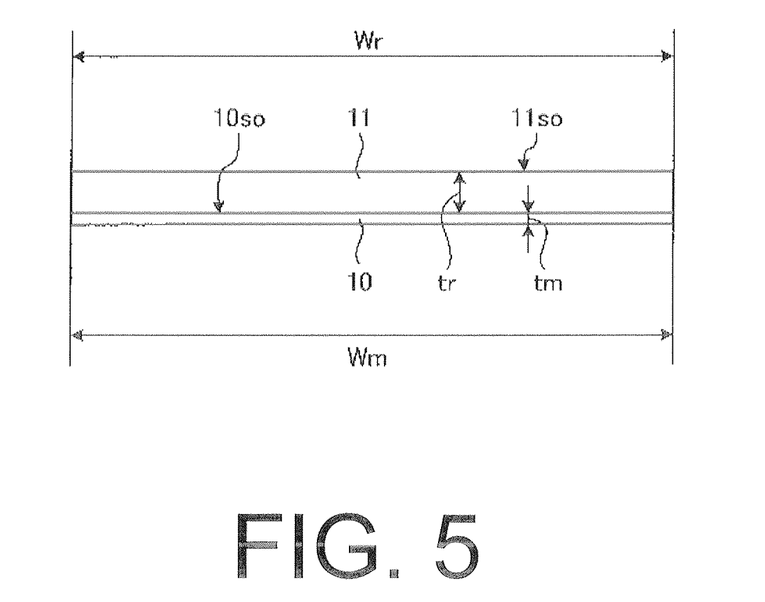
FIG. 5 is a meridian cross-sectional view of an annular structure and a rubber layer.

FIG. 5 is a meridian cross-sectional view of the annular structure 10 and the rubber layer 11. An elastic modulus of the annular structure 10 is preferably not less than 70 GPa and not more than 250 GPa. Additionally, a thickness tm of the annular structure 10 is preferably not less than 0.1 mm and not more than 2.0 mm. The thickness tm of the annular structure 10 is preferably set to a size that is appropriate to the material of the annular structure 10. A product of the elastic modulus and the thickness tm of the annular structure 10 (referred to as the "rigidity parameter") is preferably not less than 10 and not more than 500.

By configuring the rigidity parameter to be within the range described above, rigidity of the annular structure 10 in the meridian cross-section increases. As a result, when the tire 1 is filled with air and when the tire 1 makes ground contact with a road surface, deformations caused by the annular structure 10 in the meridian cross-section of the rubber layer 11 (tread portion) are suppressed. Therefore, viscoelastic energy loss of the tire 1 caused by the deformations is suppressed. Additionally, by configuring the rigidity parameter to be within the range described above, rigidity of the annular structure 10 in the radial direction decreases. As a result, the tread portion of the tire 1 pliably deforms at a ground contact portion between the tire 1 and the road surface, just as with conventional pneumatic tires. Due to such a function, the tire 1 eccentrically deforms while localized concentrations of strain and stress in the ground contact portion are avoided and, therefore, strain in the ground contact portion can be dispersed. Therefore, localized deformation of the rubber layer 11 in the ground contact portion is suppressed, resulting in ground contact area of the tire 1 being ensured and rolling resistance being reduced.

Furthermore, with the tire 1, because the in-plane meridian cross-section rigidity of the annular structure 10 is great and the ground contact area of the rubber layer 11 is ensured, ground contact length in the circumferential direction can be ensured. Therefore, lateral forces, generated when a rudder angle is input, increase. As a result, the tire 1 can obtain high cornering power. Additionally, when the annular structure 10 is manufactured from a metal, most of the air that the interior of the tire 1 is filled with will not pass through the annular structure 10. This is beneficial as it simplifies managing the air pressure of the tire 1. Therefore, declines in the air pressure of the tire 1 can be suppressed even when usage of the tire 1 is such that the tire 1 is not filled with air for an extended period of time.

A distance tr (thickness of the rubber layer 11) between the outer side 10so of the annular structure 10 and the outer side 11so of the rubber layer 11 is preferably not less than 3 mm and not more than 20 mm. By configuring the distance tr to be within such a range, excessive deformation of the rubber layer 11 when cornering can be suppressed while ensuring riding comfort. The direction parallel to the center axis (Y-axis) of the annular structure 10 or, in other words, a dimension Wm (annular structure width) in the width direction of the annular structure 10 is preferably not less than 50% (Wr×0.5) and not more than 120% (Wr×1.2) of a dimension Wr of the rubber layer 11 (rubber layer width) in the direction parallel to the center axis (Y-axis). If Wm is less than Wr×0.5, rigidity in the meridian cross-section of the annular structure 10 will be insufficient, resulting in a reduction of the region that maintains eccentric deformation with respect to the tire width. As a result, the effect of reducing rolling resistance may decline and cornering power may decrease. Moreover, if Wm exceeds Wr×1.2, the tread portion may cause buckling deformation in the center axis (Y-axis) direction of the annular structure 10 when making ground contact, and this may lead to the deformation of the annular structure 10. By configuring Wm so that Wr×0.5≤Wm≤Wr×1.2, cornering power can be maintained while rolling resistance is reduced and, furthermore, deformation of the annular structure 10 can be suppressed.

Figure 6:
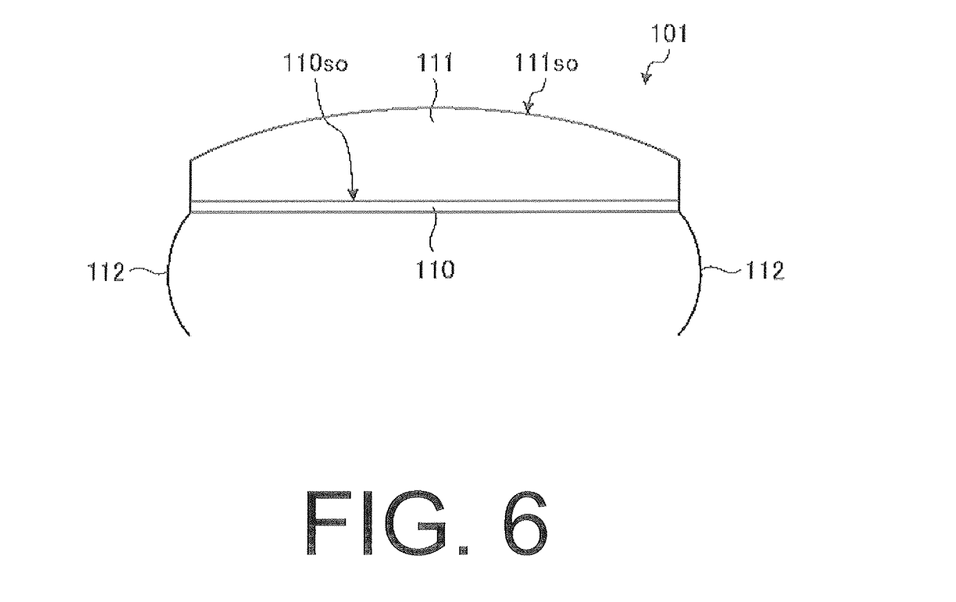
FIG. 6 is a drawing illustrating forms of the rubber layer and the annular structure in a meridian cross-section.

FIG. 6 is a drawing illustrating forms of a rubber layer 111 and an annular structure 110 in a meridian cross-section. With a tire 101 (pneumatic tire) illustrated in FIG. 6, in a meridian cross-section thereof, an outer side 111so of the rubber layer 111 protrudes outward in the radial direction at a central portion in the width direction. In contrast, an outer side 110so of the annular structure 110 is flat in the width direction. Thus, with the tire 101, in the meridian cross-section thereof, forms of the outer side 111so of the rubber layer 111 and the outer side 110so of the annular structure 110 are different. More specifically, in the meridian cross-section, a distance from the rotational axis of the outer side 110so of the annular structure 110 is constant throughout an entirety of the width direction. In contrast, the outer side 111so of the rubber layer 111 protrudes outward in the radial direction, with proximity to a center in the width direction from the outer sides in the width direction. That is, with the tire 101, a thickness of the rubber layer 111 (dimension in the radial direction) increases from the outer sides in the width direction toward the center in the width direction. When the structure described above is used, a distribution of rigidity in the width direction is generated because the distance between the outer side 111 so of the rubber layer 111 and the outer side 110so of the annular structure 110 varies in the width direction. As a result, with the tire 101, deformation conditions of the rubber layer 111 that forms the tread portion and the annular structure 110 differ, and this leads to the generation of localized strain and stress concentration in the ground contact portion. Moreover, with the tire 101, localized deformation may occur in the rubber layer 111 at the ground contact portion. As a result of this localized deformation, viscoelastic energy loss of the rubber layer 111 will increase, which may lead to an increase in rolling resistance.

In light of the above, with the tire 1, in the meridian cross-section of the structure 2 illustrated in FIG. 3, the forms of the outer side 11so of the rubber layer 11 and the outer side 10so of the annular structure 10 are preferably the same. As a result of such a configuration, when the tire 1 makes ground contact or is rolling, the rubber layer 11 (tread portion) and the annular structure 10 deform in substantially the same manner. Therefore, deformation of the rubber layer 11 of the tire 1 is reduced, and this leads to a reduction in viscoelastic energy loss and a further reduction in rolling resistance.

If the outer side 11so of the rubber layer 11 and the outer side 10so of the annular structure 10 protrude facing outward in the radial direction of the tire 1 or, alternately protrude facing inward in the radial direction of the tire 1, pressure distribution in the ground contact portion of the tire 1 will become uneven. As a result, localized concentrations of strain and stress may be generated in the ground contact portion, and localized deformation of the rubber layer 11 may occur in the ground contact portion. In this embodiment, in the tire 1, as illustrated in FIG. 3, the outer side 11so of the rubber layer 11 and the outer side 10so of the annular structure 10 preferably are parallel to the center axis (Y-axis) of the rubber layer 11 and the annular structure 10 (i.e. the structure 2). Due to such a structure, the ground contact portion of the tire 1 can be configured to be substantially flat. With the tire 1, pressure distribution in the ground contact portion is uniform and, therefore, localized concentrations of strain and stress in the ground contact portion are suppressed and localized deformation of the rubber layer 11 in the ground contact portion is suppressed. As a result, viscoelastic energy loss is reduced and, therefore, rolling resistance of the tire 1 is also reduced. Additionally, with the tire 1, localized deformation of the rubber layer 11 in the ground contact portion is suppressed and, therefore, the ground contact area can be ensured and, simultaneously, the ground contact length in the circumferential direction can be ensured. Therefore, with the tire 1, cornering power can also be ensured.

In this embodiment, as described above, the form of the rubber layer 11 in a meridian cross-section is rectangular, but said form is not limited to the rectangular form, provided that the outer side 11so of the rubber layer 11 and the outer side 10so of the annular structure 10 are parallel to the center axis (Y-axis). For example, the form of the rubber layer 11 in the meridian cross-section may be a trapezoidal shape or a parallelogram shape. When the form of the rubber layer 11 in the meridian cross-section is trapezoidal, an upper bottom or a lower bottom of the trapezoid may be the outer side 11 so of the rubber layer 11.

Figure 71:
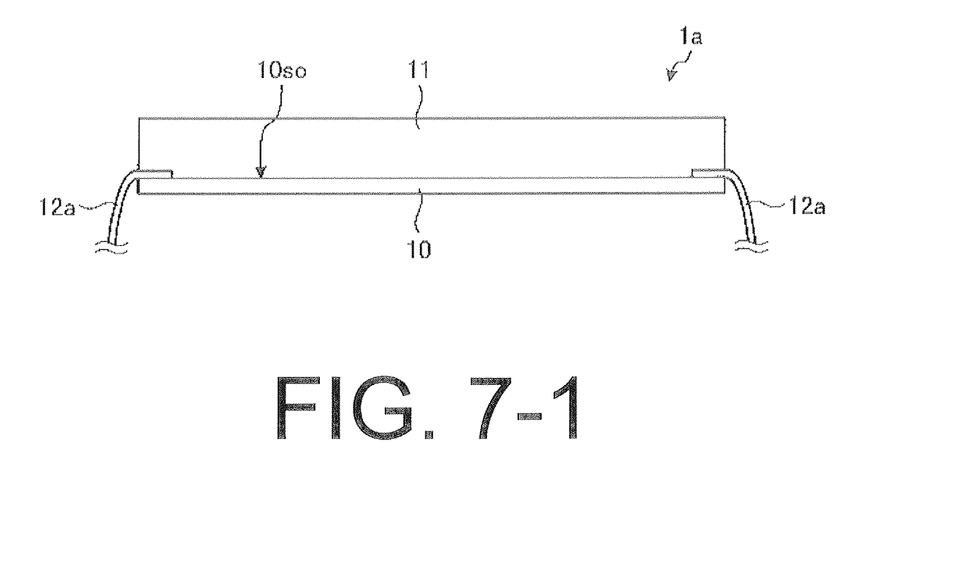
Figure 72:
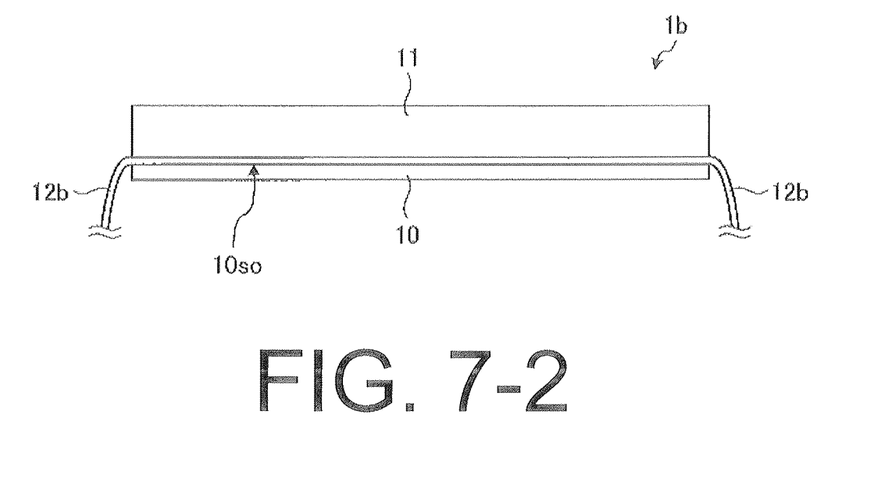
Figure 73:
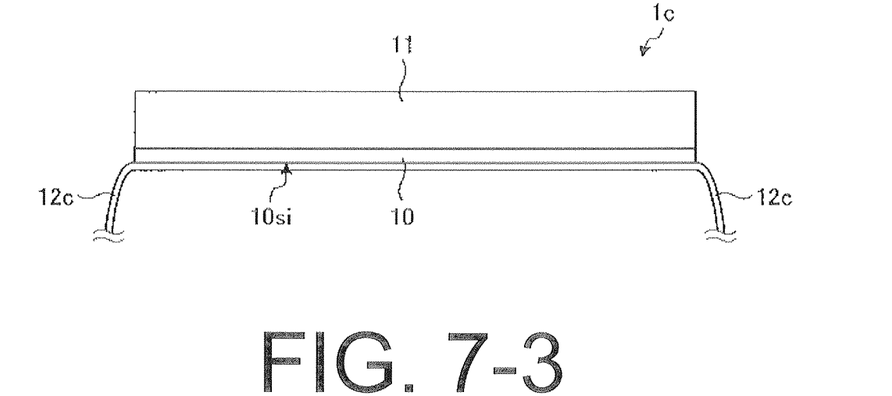
Figure 91:
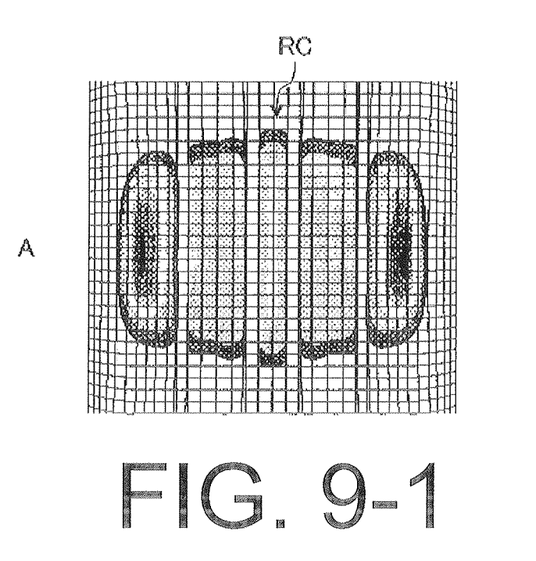
Figure 92:
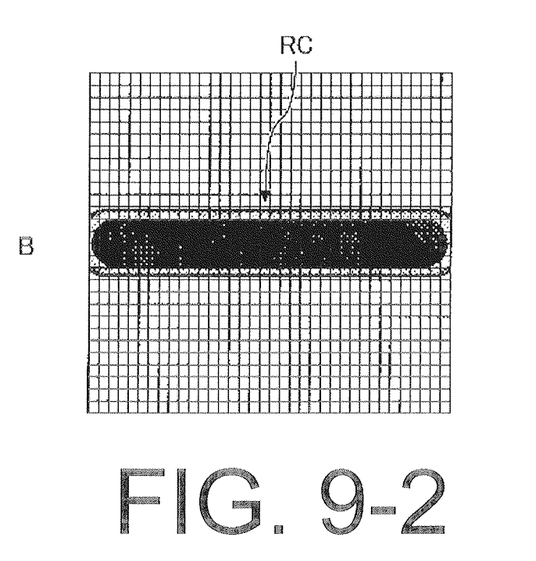
Figure 93:
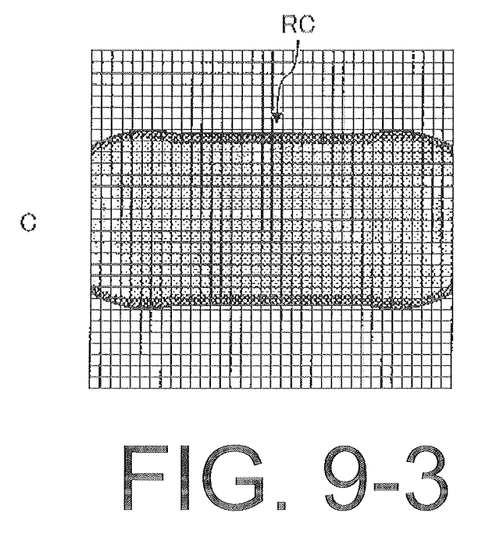

FIGS. 7-1 to 7-3 are meridian cross-sectional views illustrating tires according to modified examples of the embodiment. Other than the attachment method of the carcass portion 12a and the like to the annular structure 10, these modified examples are the same as the embodiment described above. With a tire 1a illustrated in FIG. 7-1, a first end portion of a carcass portion 12a is attached to the outer side 10so of the annular structure 10 and is sandwiched between the annular structure 10 and the rubber layer 11. With a tire 1b illustrated in FIG. 7-2, a carcass portion 12b is mounted on the outer side 10so of the annular structure 10 from a first edge to a second edge in the width direction, and is sandwiched between the annular structure 10 and the rubber layer 11 throughout the entire width direction regions of the annular structure 10 and the rubber layer 11. With a tire 1c illustrated in FIG. 7-3, a carcass portion 12c is mounted on an inner side 10si of the annular structure 10 from a first edge to a second edge in the width direction, and is fixed on the inner side 10si of the annular structure 10.

As with the tires 1a and 1b illustrated in FIGS. 7-1 and 7-2, respectively, it is preferable that the carcass portion 12 be sandwiched between the annular structure 10 and the rubber layer 11 because the carcass portion 12 will be reliably fixed between the annular structure 10 and the rubber layer 11 and high strength can be ensured. Particularly, as with the tire 1b illustrated in FIG. 7-2, if the carcass portion 12 is configured so as to cover the entire width direction region on the outer side 10so of the annular structure 10, the carcass portion 12b will not be divided in the width direction of the tire 1b and, therefore, forces acting on a joint between the carcass portion 12b and the annular structure 10 can be suppressed. As a result, with the tire 1b, the possibility of defects occurring at the joint can be reduced and, therefore, the tire 1b can be provided as a stronger structure and decreases in the durability of the tire 1b can be suppressed.

While the tire 1c illustrated in FIG. 7-3 is the same as the tire 1 illustrated in FIG. 3 with regards to the carcass portion 12c being fixed on the inner side 10si of the annular structure 10, it differs therefrom in that the carcass portion 12c is fixed throughout all regions in the width direction of the inner side 10si of the annular structure 10. As a result of this structure, with the tire 1c, the carcass portion 12c is not divided throughout the width direction of the tire 1c. With the tire 1 illustrated in FIG. 3, internal pressure acts on the joint between the carcass portion 12 and the annular structure 10, but with the tire 1c illustrated in FIG. 7-3, the internal pressure is received by the entirety of the carcass portion 12c and, therefore, internal pressure does not act on the joint between the carcass portion 12c and the annular structure 10. Thus, with the tire 1c illustrated in FIG. 7-3, the carcass portion 12c is not divided in the width direction and, therefore, forces acting on the joint between the carcass portion 12c and the annular structure 10 can be suppressed. As a result, with the tire 1c, the possibility of defects occurring at the joint can be reduced and, therefore, decreases in the durability of the tire 1c can be suppressed.

Based on the tire 1 according to the embodiment, a computer-analyzable numerical analysis model was created and analyzed via a finite element method using a computer. The tire 1 on which the numerical analysis model was based had the meridian cross-section form illustrated in FIG. 3. Dimensions of each constituent of the tire 1 were as follows: Tire width W illustrated in FIG. 3=190 mm; and Carcass height H (distance in the radial direction from a heel portion 13h of the bead portion 13 to the inner side 10si of the annular structure 10)=40 mm. The annular structure 10 was formed from spring steel and a thickness tm thereof was 0.4 mm (see FIG. 5). The rubber layer 11 was adhered and fixed on the outer side 10so of the annular structure 10. A thickness tr of the rubber layer 11 was 8 mm (see FIG. 5). A diameter of the tire 1 corresponded to the diameter of a 225/50R18 size pneumatic tire. A pair of the carcass portions 12 was respectively bonded to the both edges in the width direction of the inner side 10si of the annular structure 10.

For comparison, computer-analyzable numerical analysis models were created for a pneumatic tire having a conventional structure and a rigid tire, and ground contact analyses and rolling analyses for these tires were conducted via a finite element method using a computer. The size of the pneumatic tire having a conventional structure was 225/50R18. The rigid tire was constituted by a rubber layer provided on the periphery of an annular plate, and was a tire corresponding to the annular structure 10 included in the tire 1 illustrated in FIGS. 1 and 3 having, however, a rigidity that is much higher. A width of the rigid tire was 190 mm and a diameter thereof corresponded to the diameter of a 225/50R18 size pneumatic tire. Eccentric deformation of the rigid tire was increased to a maximum limit thereof.

Parameters used to evaluate the tire 1, the pneumatic tire having a conventional structure, and the rigid tire were: vertical rigidity Kt, horizontal rigidity Ky, cornering power CP, and rolling resistance RR. In cases where a load is applied to the evaluation subject (the numerical analysis models of the tire 1, the pneumatic tire having a conventional structure, and the rigid tire) in a direction orthogonal to the road surface, "vertical rigidity" refers to a rate of change (kN/m) of the load with respect to displacement in the direction of application of the load. In these evaluation examples, an internal pressure of 230 kPa was applied as a load to the evaluation subjects and, in this state, a reference load (4 kN) was applied to the evaluation subjects in a direction orthogonal to the road surface. The vertical rigidity was defined as the rate of change when the load applied to the evaluation subjects was varied from the reference load within a range of ±0.5 kN.

In cases where the evaluation subject is moved in the width direction (lateral direction) of the evaluation subject while a load is applied to the evaluation subject in a direction orthogonal to the road surface, "horizontal rigidity" refers to a rate of change (kN/m) of the force (lateral force) applied in the lateral direction with respect to displacement in the lateral direction (lateral direction displacement). In these evaluation examples, an internal pressure of 230 kPa was applied as a load to the evaluation subjects and a reference load (4 kN) was applied thereto in a direction orthogonal to the road surface.

In this state, the horizontal rigidity was defined as the rate of change of the lateral force with respect to the lateral direction displacement, obtained by varying the lateral force within a predetermined range. Cornering power CP was defined as the size of the force generated in the lateral direction when a rudder angle of 1 degree was applied to the evaluation subjects in a state of normal rolling of the evaluation subjects. Rolling resistance was calculated according to a method described in Japanese Patent No. 3969821. In this method, first, records of circumferential direction strain and stress corresponding to a single rotation of a tire model were extrapolated from static ground contact analysis results. Then, energy loss at each location in the tire model was found using the results (the loss tangent of the material and amplitude) of a Fourier Transferal of said records. The rolling resistance was calculated by first finding the energy loss throughout the entire tire model by adding together the energy loss at each location in the entire tire model, and then dividing this total energy loss by the circumferential length of the tire model.

Figure 8:
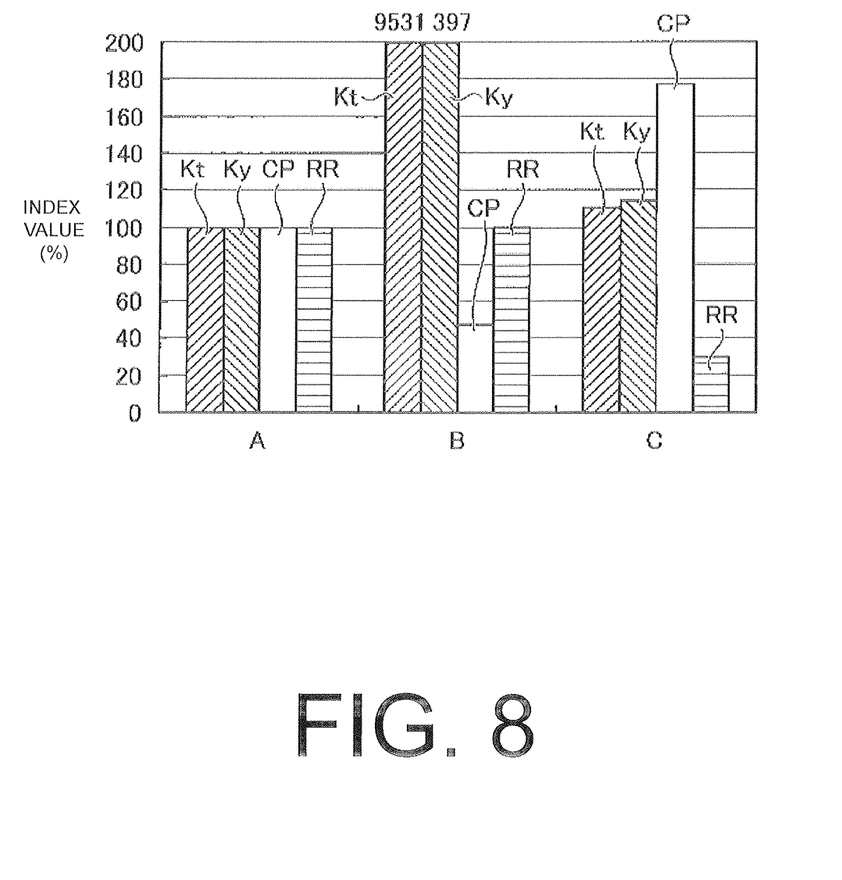
FIG. 8 is a chart showing evaluation results.

FIG. 8 is a chart showing evaluation results. In FIG. 8, the vertical rigidity Kt, the horizontal rigidity Ky, the cornering power CP, and the rolling resistance RR (parameters) results are shown for the pneumatic tire having a conventional structure, the tire 1, and the rigid tire, the values of the pneumatic tire having a conventional structure being set to 100. Larger values for cornering power CP are preferable and smaller values for rolling resistance RR are preferable. Excessively high vertical rigidity Kt and horizontal rigidity Ky are not preferable.

As is clear from the results shown in FIG. 8, compared to the pneumatic tire having a conventional structure, the tire 1 has increased cornering power CP and significantly reduced rolling resistance RR. More specifically, the cornering power CP of the tire 1 is increased to nearly 180% of that of the pneumatic tire having a conventional structure. The rolling resistance RR of the tire 1 is reduced to about 30% of that of the pneumatic tire having a conventional structure. From these results, it is thought that fuel consumption of the tire 1 will be improved and turning performance will be enhanced compared with the pneumatic tire having a conventional structure. Additionally, it is thought that riding comfort equivalent to that of a conventional pneumatic tire can be ensured because the vertical rigidity Kt of the tire 1 is equivalent to that of the pneumatic tire having a conventional structure.

On the other hand, compared to the pneumatic tire having a conventional structure and the tire 1, the vertical rigidity Kt of the rigid tire increases excessively, which is thought to lead to a decline in riding comfort. Additionally, the ground contact portion is prone to localized deformation and the ground contact area and the ground contact length in the circumferential direction are reduced because the vertical rigidity Kt of the rigid tire is excessively high. It is thought that this results in increases in the rolling resistance RR and decreases in the cornering power CP of the rigid tire. While the eccentric deformation itself increases in the tire 1, because the vertical rigidity Kt is smaller in the tire 1 compared to the rigid tire, it is thought that the eccentric deformation will be maintained. Therefore, in the tire 1, eccentric deformation can be maintained while ground contact area is ensured. As a result, with the tire 1, it is thought that the reduction of the rolling resistance RR and the enhancement of the cornering power CP can be realized because localized deformation at the ground contact portion can be suppressed and ground contact area and ground contact length in the circumferential direction can be ensured.

FIGS. 9-1, 9-2, and 9-3 are plan views illustrating ground contact patch forms of evaluation subjects in the evaluations. FIG. 9-1 illustrates the results of a conventional pneumatic tire, FIG. 9-2 illustrates the results of a rigid tire, and FIG. 9-3 illustrates the results of the tire 1 depicted in FIG. 3 (the embodiment). Less variation in shading indicates less variation in ground contact pressure. As illustrated in FIG. 9-2, compared to the conventional pneumatic tire, the rigid tire has a smaller ground contact area of a ground contact portion RC, which results in a higher ground contact pressure. In contrast, the ground contact area of the ground contact portion RC is wider in the tire 1 than in the rigid tire, and is equivalent to that of the conventional pneumatic tire. Moreover, the ground contact length in the circumferential direction of the ground contact portion RC of the tire 1 is maintained equivalent to that of the conventional pneumatic tire and, compared to the conventional pneumatic tire, the ground contact pressure thereof is more uniform.

As described above, the pneumatic tire according to this embodiment has an annular structure with a rigidity parameter (defined as the product of the elastic modulus and the thickness) that is not less than 10 and not more than 500, and a rubber layer disposed on an outer side of the annular structure. Due to such a structure, the tire of this embodiment eccentrically deforms while localized concentrations of strain and stress of the rubber layer in the ground contact portion are avoided and, therefore, strain in the ground contact portion can be dispersed. As a result, with the tire of this embodiment, localized deformation of the rubber layer in the ground contact portion is suppressed and, therefore, concentrations of strain and stress in the ground contact portion are dispersed and rolling resistance is reduced. Thus, with this embodiment, a structure whereby the rolling resistance of a pneumatic tire is reduced can be provided.

Additionally, as a result of the structure described above, with the pneumatic tire according to this embodiment, when the rubber layer becomes worn, the rubber layer can be removed from the annular structure and a new rubber layer can be attached to the annular structure. Thus, retreading is facilitated. With the pneumatic tire according to this embodiment, provided that defects are not produced, the carcass and the annular structure can be used multiple times. As a result, waste components are reduced and environmental impact is lightened. Furthermore, with the pneumatic tire according to this embodiment, the annular structure is formed by forming a plate-like member into a cylindrical form, and the annular structure is disposed so as to surround the space filled with air. As a result, with the pneumatic tire according to this embodiment, the annular structure prevents the intrusion of foreign objects from the road contact surface (outer side of the rubber layer) into the space filled with air. Therefore, the pneumatic tire according to this embodiment has a benefit of not being prone to punctures.

What is claimed is:

1. A pneumatic tire comprising:
   a cylindrical annular structure being formed of a metal plate;
   a rubber layer that will become a tread portion provided along a circumferential direction of the annular structure on an outer side of the annular structure, a width of the tread portion being defined by a width of the rubber layer;
   a carcass portion including fibers covered with rubber, provided on both sides in a direction parallel to a center axis of a cylindrical structure including the annular structure and the rubber layer; and
   an inner liner provided on an inner side of the carcass portion; wherein
   in a meridian cross-section of the structure, an outer side of the rubber layer and the outer side of the annular structure have the same form; and
   a width of the annular structure is greater than or equal to a width of the rubber layer, thereby terminating the rubber layer within a width of the annular structure.

2. The pneumatic tire according to claim 1, wherein the outer side of the rubber layer and the outer side of the annular structure are parallel to the center axis.

3. The pneumatic tire according to claim 2, wherein the annular structure is disposed farther inward in a radial direction of the structure than the carcass portion.

4. The pneumatic tire according to claim 1, wherein the annular structure is disposed farther inward in a radial direction of the structure than the carcass portion.

5. The pneumatic tire according to claim 1, wherein a distance between the outer side of the annular structure and the outer side of the rubber layer is not less than 3 mm and not more than 20 mm.

6. The pneumatic tire according to claim 1, wherein a meridian cross-section form of the rubber layer is rectangular.

7. The pneumatic tire according to claim 1, wherein the rubber layer comprises a tread pattern formed from a plurality of grooves in the outer side of the rubber layer.

8. The pneumatic tire according to claim 1, wherein an elastic modulus of the annular structure is not less than 70 GPa and not more than 250 GPa.

9. The pneumatic tire according to claim 1, wherein a thickness of the annular structure is not less than 0.1 mm and not more than 2.0 mm.

10. The pneumatic tire according to claim 1, wherein a product of an elastic modulus of the annular structure and a thickness of the annular structure is not less than 10 GPa·mm and not more than 500 GPa·mm.

11. The pneumatic tire according to claim 1, wherein the carcass portion is sandwiched between the annular structure and the rubber layer.

12. The pneumatic tire according to claim 11, wherein the carcass portion is configured so as to cover an entire width direction region on the outer side of the annular structure.

13. The pneumatic tire according to claim 1, wherein the carcass portion extends at least partially along an inner side of the rubber layer in a tire radial direction.

14. The pneumatic tire according to claim 1, wherein:
   surfaces of the annular structure and the rubber layer extending along the width of the annular structure and the annular rubber layer are substantially planar, and
   the annular structure is exposed at ends thereof.

15. The pneumatic tire according to claim 1, wherein the annular structure comprises a uniform cross-sectional height along a width of the annular structure.

16. A pneumatic tire comprising:
   a cylindrical annular structure being formed of a metal plate;
   a rubber layer that will become a tread portion provided along a circumferential direction of the annular structure on an outer side of the annular structure, a width of the tread portion being defined by a width of the rubber layer;
   a carcass portion including fibers covered with rubber, provided on both sides in a direction parallel to a center axis of a cylindrical structure including the annular structure and the rubber layer; and an inner liner provided on an inner side of the carcass portion; wherein in a meridian cross-section of the structure, an outer side of the rubber layer and the outer side of the annular structure have the same form;

a width of the annular structure is greater than or equal to a width of the rubber layer, thereby terminating the rubber layer within a width of the annular structure; and the carcass portion is sandwiched between the annular structure and the rubber layer, and the carcass portion is divided and discontinuous in a width direction of the pneumatic tire.

\* \* \* \* \*